(12) United States Patent
Faibish et al.

(10) Patent No.: US 8,955,076 B1
(45) Date of Patent: Feb. 10, 2015

(54) CONTROLLING ACCESS TO A PROTECTED RESOURCE USING MULTIPLE USER DEVICES

(71) Applicant: EMC Corporation, Hopkinton, MA (US)

(72) Inventors: Sorin Faibish, Newton, MA (US); Yedidya Dotan, Newton, MA (US); John A. Murray, Waltham, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/729,996

(22) Filed: Dec. 28, 2012

(51) Int. Cl.
G06F 7/04 (2006.01)
H04L 29/06 (2006.01)

(52) U.S. Cl.
CPC ...................................... *H04L 63/08* (2013.01)
USPC ............................................................ 726/7

(58) Field of Classification Search
CPC ............ G06F 21/31; H04L 63/08; H04L 9/32
USPC ........................................................... 726/7
See application file for complete search history.

(56) References Cited

U.S. PATENT DOCUMENTS

| 7,058,597 | B1 | 6/2006 | Ronning et al. | |
|---|---|---|---|---|
| 7,958,544 | B2* | 6/2011 | Chen et al. | 726/5 |
| 8,239,683 | B2 | 8/2012 | Scherzer et al. | |
| 2001/0056410 | A1 | 12/2001 | Ishigaki | |
| 2003/0046539 | A1 | 3/2003 | Negawa | |
| 2005/0097320 | A1* | 5/2005 | Golan et al. | 713/166 |
| 2006/0156385 | A1* | 7/2006 | Chiviendacz et al. | 726/2 |
| 2008/0022377 | A1* | 1/2008 | Chen et al. | 726/5 |
| 2008/0028447 | A1 | 1/2008 | O'Malley et al. | |
| 2009/0217038 | A1* | 8/2009 | Lehtovirta et al. | 713/168 |
| 2010/0057614 | A1 | 3/2010 | Rainey et al. | |
| 2010/0077222 | A1 | 3/2010 | Scherzer et al. | |
| 2011/0173122 | A1 | 7/2011 | Singhal | |

(Continued)

OTHER PUBLICATIONS

Weigold, et al., "The Zurich Trusted Information Channel—An Efficient Defence against Man-in-the-Middle and Malicious Software Attacks", Trusted Computing—Challenges and Applications, Lecture Notes in Computer Science, 2008, vol. 4968/2008, Springer Berlin/Heidelberg, pp. 75-91.

(Continued)

*Primary Examiner* — Teshome Hailu
(74) *Attorney, Agent, or Firm* — BainwoodHuang (57) ABSTRACT

A technique controls access to a protected resource residing on a protected resource server. The technique involves conveying, in response to a user request to access the protected resource residing on the protected resource server, a challenge from a resource accessing device to an access control device. The technique further involves transmitting an answer to the challenge from the access control device to the resource accessing device. The technique further involves completing an authentication operation based on the answer to the challenge. The resource accessing device obtains electronic access to the protected resource residing on the protected resource server when the authentication operation results in successful authentication. The resource accessing device does not obtain electronic access to the protected resource residing on the protected resource server when the authentication operation results in unsuccessful authentication.

22 Claims, 5 Drawing Sheets

(56) References Cited

U.S. PATENT DOCUMENTS

2011/0235806 A1   9/2011  Fukuda
2011/0276496 A1   11/2011 Neville et al.
2011/0307947 A1*  12/2011 Kariv et al. .................. 726/9
2012/0030745 A1   2/2012  Bauer

OTHER PUBLICATIONS

Mitchell, John, "Key Management Protocols and Compositionality", Stanford, TECS Week, 2005, 30 pages.

Chen's Personal Blog, "Derived Unique Key Per Transaction", Jun. 9, 2009, pp. 1-5.

Ortiz-Yepes, Diego Alejandro, "Enhancing Authentication in eBanking with NFC Enabled Mobile Phones", Masters Thesis, Aug. 11, 2008, pp. 1-96.

Jeroen, "WAP Push Over SMS", http://mobiletidings.com/2009/02/20/wap-push-over-sms/, Feb. 20, 2009, pp. 1-2.

Philpott, Robert S., et al., "Multi-Channel Transaction Signing", U.S. Appl. No. 12/820,829, filed Jun. 22, 2010.

\* cited by examiner

CONTROLLING ACCESS TO A PROTECTED RESOURCE USING MULTIPLE USER DEVICES

BACKGROUND

It is burdensome for a human to remember multiple usernames and passwords. Nevertheless, in order to access different resources from a computerized device, the human may need to enter different username and password pairs into the computerized device. For example, the human may need to remember and enter a first username and a first password to access an online bank account from the computerized device. Additionally, the human may need to remember and enter a second username and a second password to access a virtual private network (VPN) from the computerized device, and so on.

One conventional approach to managing usernames and passwords is for the human to store this information on the computerized device itself (hereinafter referred to as the locally stored password approach). For example, the human may store the usernames and passwords in a readable text file. As another example, some third-party software products allow the human to store multiple usernames and passwords within a local browser application that runs on the computerized device. In order to gain initial access to the computerized device or to the local browser application, the human must enter one username and one password (i.e., single sign on). Then, to gain access to a particular resource using the local browser application, the human simply selects the resource via a single push of a button on the computerized device, and the local browser automatically submits the correct locally stored username and password for the selected resource in order to gain access to that resource.

Another conventional approach to managing usernames and passwords is for the human to store the username and password information at a third-party website (hereinafter referred to as the online password storage approach). Under this approach, the human simply submits one username and one password into the third-party website via the computerized device (i.e., single sign on). Then, via a single push of a button on the computerize device, the human selects a particular resource and directs the computerized device to automatically retrieve the proper username and password from the third-party website and submit the retrieved username and password to login the human to a selected resource.

SUMMARY

Unfortunately, there are deficiencies to the above-described conventional approaches to managing usernames and passwords on behalf of a human. In particular, in the above-described conventional locally stored password approach where usernames and passwords are stored locally within the human's computerized device (e.g., in a text file or a browser), a thief may be able to steal the computerized device from the human. Then, once the thief defeats the single sign on feature on the stolen computerized device, the thief is able to access all of the protected resources using the stolen computerized device. Additionally, if the human loses the computerized device, the human has no further ability to electronically control access. That is, the human must manually contact all of the resource providers to prevent further access to the resources. This may take significant time and effort. Moreover, it is possible that the human will not remember all of the resources that were accessible via the computerized device, and thus some resources could fully succumb to the thief.

Furthermore, in the above-described conventional online password storage approach, a thief may be able to compromise the third-party website which manages the human's usernames and password and then access the resources from any computerized device (i.e., the thief's computerized device). For example, the thief could guess the human's username and password and access the third-party website to defeat a single sign on feature. The human may have no way of knowing that a thief has gained access to the third-party website. Moreover, as in the conventional locally stored password approach, once the human eventually discovers that a security breach has occurred, the human must manually contact each resource provider to prevent further access via the lost computerized device, and this may take significant time and effort.

In contrast to the above-described conventional approaches, improved techniques are directed to controlling access to a set of protected resources using multiple user devices: a resource accessing device and an access control device. Both of these user devices should be in the possession of a single legitimate user in order for that user to access each protected resource. In particular, the user accesses each protected resource via the resource accessing device. Additionally, the user approves access and is informed of ongoing access via the access control device.

The involvement of these two user devices provides stronger security than one conventional computerized device which locally stores passwords, i.e., as in the above-described conventional locally stored password approach. In particular, if the user loses the resource accessing device, the user is still able to control access (i.e., approve or deny access) via the access control device. Along these lines, suppose that a thief not only steals the resource accessing device from the user, but also is able to defeat any locking mechanism on the resource accessing device (e.g., a single sign-on user identifier and passcode to unlock access to the resource accessing device). Any attempt to access the protected resource will be detected by the access control device. With user alerted to an unauthorized access attempt, the user will be able to lockout the resource accessing device using the access control device.

Likewise, if the user loses the access control device or if the access control device is stolen, access to the set of protected resources has not been compromised because the user still has not lost the resource accessing device which is the specific device which accesses the set of protected resources. Rather, if a thief is able to defeat any locking mechanism on the access control device (e.g., a single sign-on user identifier and passcode to unlock access to the access control device), all that that thief can do with the access control device is deny the resource accessing device from accessing the resource. Accordingly, the set of protected resources is still safe.

For the reasons above, security is stronger with the involvement of multiple user devices. Furthermore, the legitimate user is still able to enjoy significant conveniences such as storage and management of multiple username and passwords. Additionally, the user is able to unlock the user devices via single sign-on (e.g., a single sign-on for each user device). Also, the user has other advantages such as, from the access control device, the ability to terminate an unwanted access session involving the resource accessing device, the ability to lockout access to all protected resources, and so on.

Examples of suitable user devices include general purpose computers, user workstations, laptop computers and notebooks, tablet devices, smart phones, combinations thereof, and the like. Such devices have user interfaces to obtain user input and provide user output. Additionally, such devices have network interfaces in order to effectively communicate with other devices.

One embodiment is directed to a method of controlling access to a protected resource residing on a protected resource server. The method includes conveying, in response to a user request to access the protected resource residing on the protected resource server, a challenge from a resource accessing device to an access control device. The method further includes transmitting an answer to the challenge from the access control device to the resource accessing device. The method further includes completing an authentication operation based on the answer to the challenge. The resource accessing device obtains electronic access to the protected resource residing on the protected resource server when the authentication operation results in successful authentication. However, the resource accessing device does not obtain electronic access to the protected resource residing on the protected resource server when the authentication operation results in unsuccessful authentication.

In some arrangements, the challenge requires a simple button press from the access control device. The button press may itself represent user authorization. Alternatively, the button press may trigger the access control device to send a passcode to the resource accessing device as the answer to the challenge. The passcode may be generated internally by the access control device or obtained from an external passcode server. For the purposes of this disclosure, the term passcode refers to any sequence of characters, numbers, symbols, words, phrases, meaningful information, and the like which is used to unlock access to a protected resource.

In other arrangements, the challenge requires more user input than a simple button press. For example, the user may need to manually provide, as the answer to the challenge, input to a knowledge-based authentication (KBA) question, a password or certificate, and so on.

In some arrangements, the authentication operation involves risk-based (or adaptive) authentication in which the user responds to a standard query such as a request for a passcode or similar response, and a risk-based authentication engine evaluates the passcode as well as extraneous factors to derive a risk score indicating a level of risk. Such extraneous factors may include location information, time of day information, and typing speed, among others. Risk-based authentication is considered successful if the risk score is below a predetermined risk threshold. Otherwise, if the risk score is above the predetermined risk threshold, authentication is considered unsuccessful, i.e., the situation is deemed too risky and authentication fails.

It should be understood that any failed authentication attempt may be followed by a subsequent authentication operation (i.e., a retry), a lockout (e.g., after a set number of failed authentication attempts), and alert, and so on. In some arrangements, after a failed authentication attempt, the user is provided with a more difficult challenge (i.e., step up authentication).

In some arrangements, following successful authentication in which the user is granted access to the protected resource and establishes a session between the resource accessing device and the protected resource, the user is periodically required to provide input into the access control device in order to maintain the session (e.g., further button presses, further passcodes, etc.). If periodic input is not properly provided by the user into the access control device or if the user enters a special termination command into the access control device, the access control device outputs a signal which terminates the session between the resource accessing device and the protected resource, i.e., the resource accessing device is subsequently locked out.

It should be understood that, in the cloud context, certain circuitry of the overall system (e.g., a protected resource server, an authentication server, a password server, etc.) may be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in controlling access to a set of protected resources using multiple user devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling access to a set of protected resources using multiple user devices, namely, a resource accessing device and an access control device. Both of these user devices should be in the possession of a single legitimate user in order for that user to access each protected resource. In particular, the user accesses the set of protected resources via the resource accessing device. Additionally, the user approves access and is informed of ongoing access via the access control device.

Figure 1:
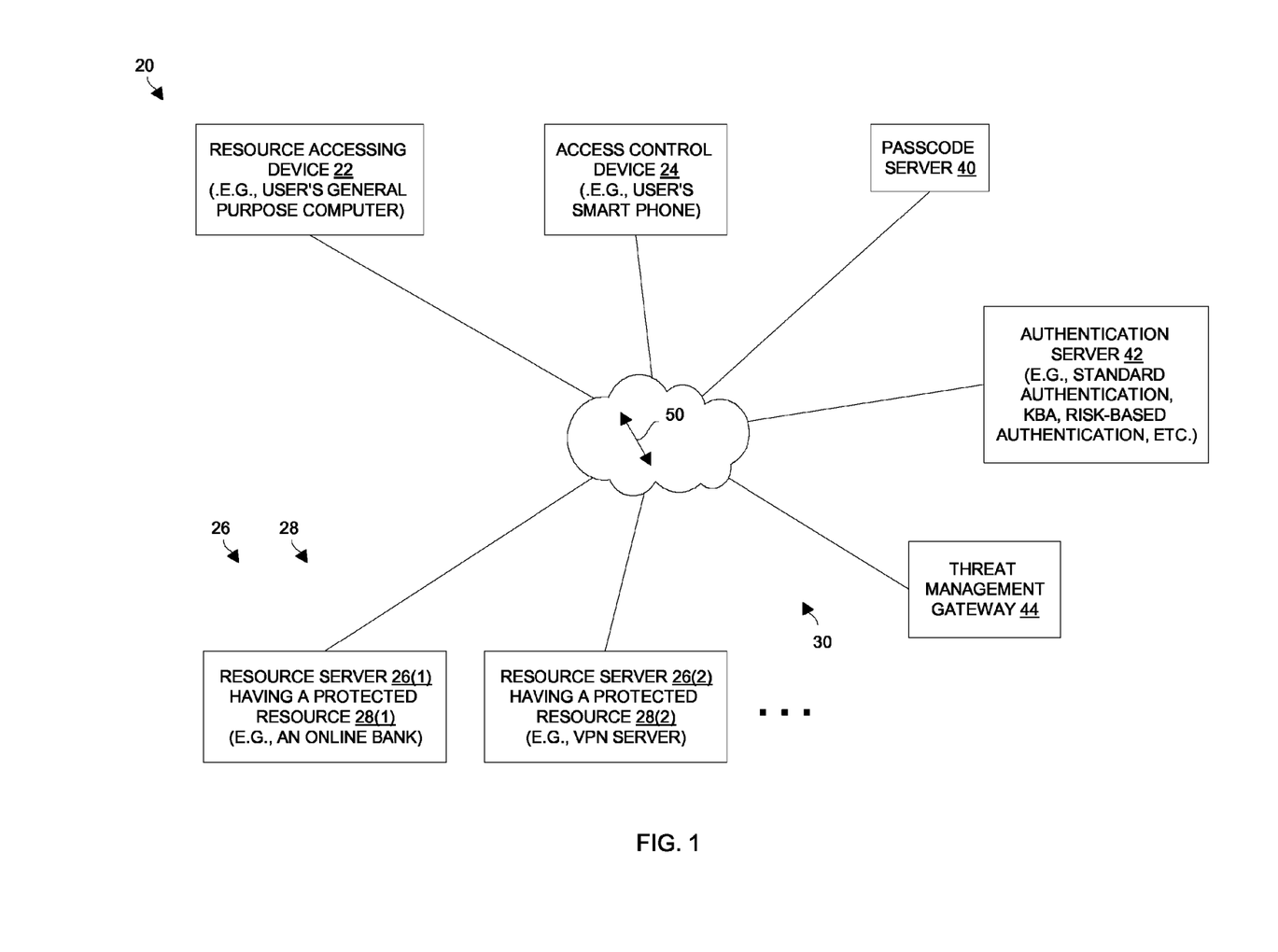
FIG. 1 is a block diagram of an electronic environment which is suitable for use in controlling access to a set of protected resources residing on a set of resource servers.

FIG. 1 shows an electronic environment 20 which is suitable for controlling access to a protected resource. The electronic environment 20 includes a resource accessing device 22, an access control device 24, resource servers 26(1), 26(2), ... (collectively, resource servers 26) having protected resources 28(1), 28(2), ... (collectively, protected resources 28), and a communications medium 30. In some arrangements, the electronic environment 20 further includes one or more other components as well such as a passcode server 40, an authentication server 42, and a threat management gateway 44.

The resource accessing device 22 and the access control device 24 are intended to be in the possession of a single user (i.e., under control of that user). The resource accessing device 22 (e.g., a general purpose computer running specialized code) is constructed and arranged to provide the user with access to the protected resources 28 of the resource servers 26. The access control device 24 (e.g., a smart phone running specialized code) is constructed and arranged to routinely participate in authentication of the user when the user utilizes the resource accessing device 22 to access a protected resource 28. As will be explained in further detail below, proper operation of both the resource accessing device 22 and the access control device 24 is required of the user in order for the user to obtain access to the protected resource 28.

Each resource server 26 is constructed and arranged to allow the resource accessing device 22 to access to a respective protected resource 28 following successful user authentication. For example, the resource server 26(1) may be a bank which provides online access to user bank accounts, i.e., online banking transactions. As another example, the resource server 26(2) may be a virtual private network (VPN) server which provides VPN access to an organization's computer network. Other resource servers 26 and protected resources 28 are suitable for use as well such as online stores, online brokerages, file servers, database servers, audio/video subscriber websites, social media websites, and so on. Moreover, some resource servers 26 may be constructed and arranged to provide access to multiple protected resources 28.

The communications medium 30 is constructed and arranged to connect the various components of the electronic environment 20 together to enable these components to exchange electronic signals 50 (e.g., see the double arrow 50). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

The passcode server 40 is constructed and arranged to operate as an external repository of user identifiers and passwords. In particular, the access control device 24 may access the passcode server 40 via user identifiers (e.g., usernames, numbers, etc.) and passcodes (e.g., passwords). Along these lines, the passcode server 40 may store and manage, in entries of a database, encrypted secrets for passcode generation for different users. Such storage may be via SQL, KV store, and so on for proper matching between a passcode request and the proper database entry. For example, the passcode server 40 may operate within a massively parallel processing (MPP) environment. In particular, one or more databases of the passcode server 40 may take the form of a relational database (e.g., Greenplum, offered by EMC Corp. of Hopkinton, Mass.), a file-based NoSQL database (e.g., Hadoop, offered by EMC Corp. of Hopkinton, Mass.), or a column-oriented No-SQL database (e.g., Cassandra, offered by EMC Corp. of Hopkinton, Mass.). Furthermore, such passcodes may be strong passcodes (e.g., several characters or bits in length, one-time use passcodes, and so on).

The authentication server 42 is constructed and arranged to perform authentication operations to authenticate the user. Such authentication operations may involve standard authentication (e.g., single factor authentication, multi-factor authentication, etc.), knowledge-based authentication (KBA), risk-based authentication, secure socket layer (SSL) authentication, public key infrastructure (PKI) authentication, trust seal authentication, biometric authentication, combinations thereof, and so on. In order to manage multiple users, database techniques similar to those mentioned above for the passcode server 40 may be implemented on the authentication server 42.

The threat management gateway 44 is constructed and arranged to operate as a choke point (or cutoff point). That is, in some arrangements, access sessions between the resource accessing device 22 and the resource servers 26 involves the threat management gateway 44. In these arrangements, the access control device 24 has the ability to terminate (or prevent creation of) access sessions between the resource accessing device 22 and the resource servers 26 through the threat management gateway 44. Further details will now be provided with reference to FIG. 2.

Figure 2:
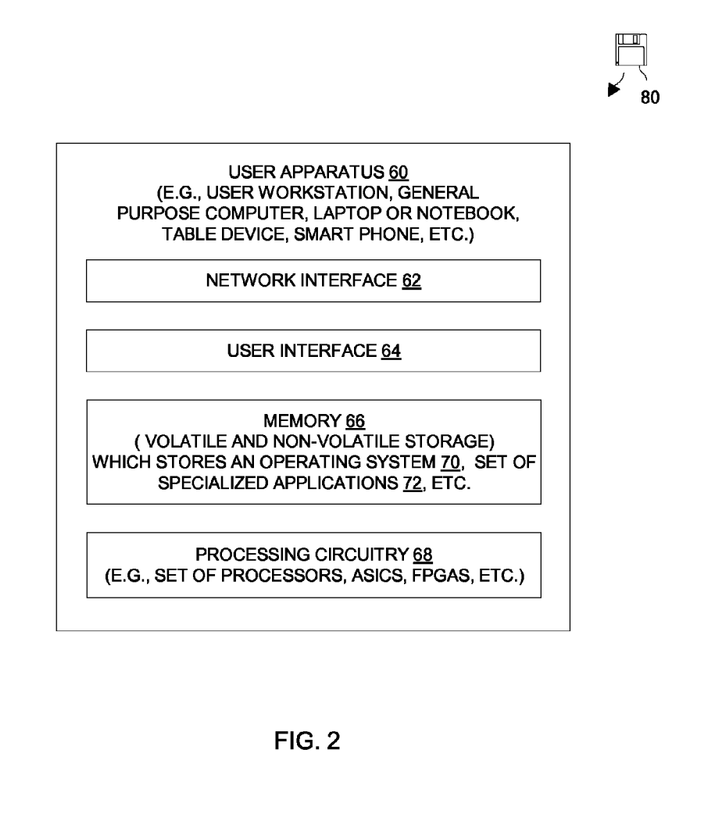
FIG. 2 is a block diagram of a user apparatus which is suitable for a resource accessing device and for an access control device of the electronic environment of FIG. 1.

FIG. 2 shows particular details of an electronic user apparatus 60 which is suitable for use as the resource accessing device 22. Another electronic user apparatus 60 is suitable for use as the access control device 24. The electronic user apparatus 60 includes a network interface 62, a user interface 64, memory 66, and processing circuitry 68. The form factor of the electronic user apparatus 60 may be that of a user workstation, a general purpose computer, a laptop or notebook computer, a tablet device, a smart phone, combinations thereof, etc.

The network interface 62 is constructed and arranged to connect the electronic user apparatus 60 to the communications medium 30. Accordingly, the network interface 62 enables the electronic user apparatus 60 to communicate with the other components of the electronic environment 20 (FIG. 1). Such communications may be copper-based or wireless (i.e., IP, cellular, Bluetooth, combinations thereof, and so on).

The user interface 64 is constructed and arranged to receive input from a user and provide output to the user. In the context of a standalone computer, the user interface 64 may be formed by a standard keyboard, pointing device (e.g., mouse) and display. In the context of tablet or a smart phone, the user interface 74 may be formed by other components such as a miniature keyboard, a touch screen, a camera, a microphone, an accelerometer, and so on.

The memory 66 is intended to represent both volatile storage (e.g., DRAM, SRAM, etc.) and non-volatile storage (e.g., flash memory, magnetic disk drives, etc.). The memory 66 stores a variety of software constructs including an operating system 70 and a set of specialized applications 72 which control the operation of the user apparatus 60. As will be explained in further detail shortly, the set of specialized applications 72 enables the electronic user apparatus 60 to properly operate as one of the user devices 22, 24.

The processing circuitry 68 is constructed and arranged to operate in accordance with the various software constructs stored in the memory 66. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software to the electronic user apparatus 60. The computer program product 80 has a non-transitory (or non-volatile) computer readable medium which stores a set of instructions which controls one or more operations of the electronic user apparatus 60. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 3.

Figure 3:
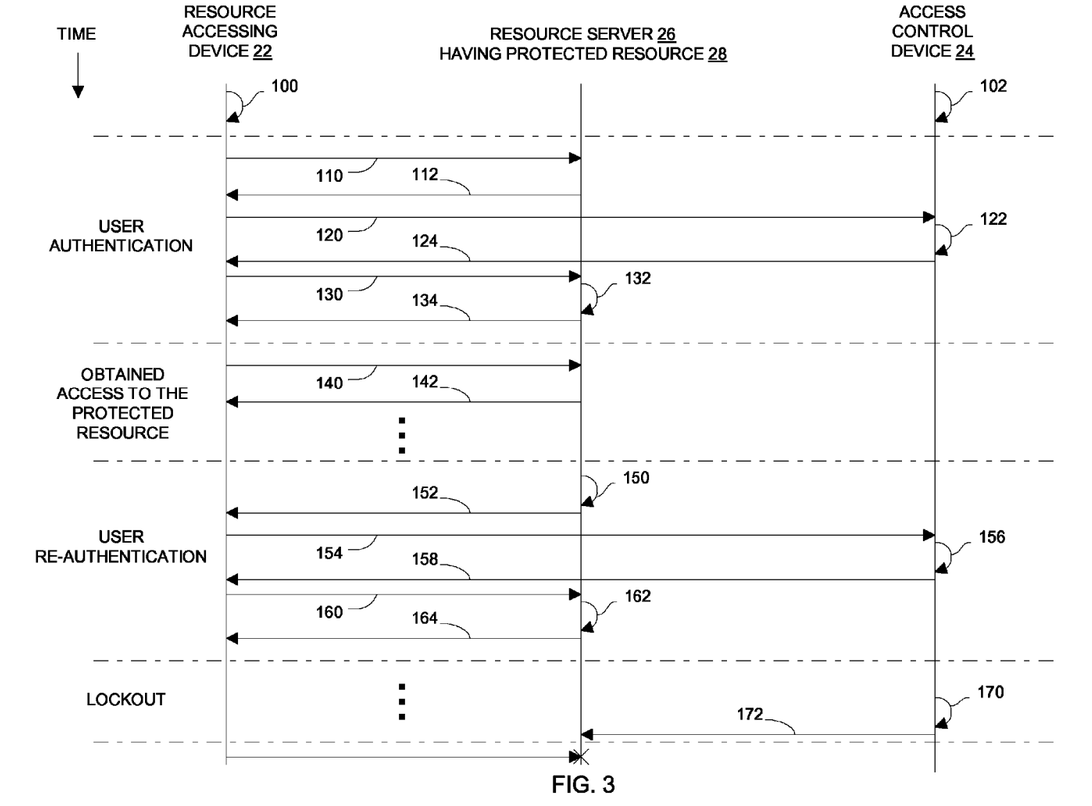
FIG. 3 is a sequence diagram illustrating certain operation of the electronic environment of FIG. 1.

FIG. 3 is a simplified sequence diagram showing particular operational details involving certain components of the electronic environment 20. At the start of operation, the resource accessing device 22 and the access control device 24 are under control of (i.e., in possession of) the legitimate user. It should be understood that the various communications shown in FIG. 3 are in the form of electronic signals 50 through the communications medium 30 (FIG. 1).

At 100, the user authenticates on the resource accessing device 22. Such activity may involve the user entering a user identifier, a personal identification number (PIN), a password, and/or other identification (e.g., a fingerprint scan, a face scan, a retina scan, a voice scan, etc.) into the resource accessing device 22. Additionally, such activity may unlock the entire resource accessing device 22 (i.e., a single sign on thus alleviating the need for the user to sign on a second time on the resource accessing device 22).

At 102, the user authenticates on the access control device 24 in a similar manner to that of 100. Again, such activity may unlock the entire access control device 24 (i.e., a single sign on).

At this point, the user is in possession of both user devices 22, 24 and both user devices 22, 24 are unlocked. In this situation, the user is able to securely access the protected resource 28 of the resource server 26.

To obtain access to the protected resource 28 of the resource server 26, the user selects the protected resource 28 among multiple selections. For example, the user may navigate a viewable list of selectable resources displayed on the user interface 62 of the resource accessing device 22 (also see FIG. 2), and press a button (or field) of the viewable list to select the protected resource 28. Such operation enables the user to access multiple protected resources 28 from the resource accessing device 22. In response to the user selection, the resource accessing device 22 sends an access request 110 to the resource server 26. The access request 110 includes identifying data (e.g., a user ID, a username, a user cookie, etc.) which identifies the user and/or the resource accessing device 22 to the resource server 26.

In response to the access request 110, the resource server 26 looks up the identifying data in a user database to determine whether the user is in the user database (i.e., whether there is an entry in the user database that corresponds to the user identifying data). If the user is not in the user database, the resource server 26 may return an error or notification message. If user is in the user database, the resource server 26 returns a challenge message 112. The challenge message 112 includes a user challenge which requires a response.

Upon receipt of the challenge message 112 from the resource server 26, the resource accessing device 22 then sends a permission request 120 to the access control device 24. The permission request 120 includes a copy of the user challenge from the challenge message 112.

At 122, the access control device 24 receives the permission request 120 from the resource accessing device 22, and prompts the user for permission. In particular, the user receives an alert which is outputted by the user interface 62 (FIG. 2) of the access control device 24, e.g., a displayed message and prompt, an audio tone, combinations thereof, and so on. It should be understood that the access control device 24 may be configured to perform this operation for each protected resource 28 the user attempts to access using the resource access device 22.

In some arrangements, the user simply presses a button on the user interface 64 of the access control device 24 (FIG. 1) which automatically provides an answer to the user challenge. That is, this button press may simply provide an approval message as the answer. Alternatively, the button press may supply a set of authentication factors as the answer (e.g., a copy of a passcode stored in the access control device 24, a one-time use passcode dynamically generated by the access control device 24 or generated externally, etc.).

In other arrangements, the user manually provides input into the user interface 62 of the access control device 24. This input may include a passcode, e.g., the user may re-enter the same passcode that the user entered to unlock the access control device 24, or a new passcode. Alternatively, the user may provide biometric input, e.g., a fingerprint scan, a facial scan, a retina scan, a voice scan, etc.

It should be understood that the passcode for authentication may be an access code using a soft key as a two step form of authentication from the access control device to a passcode server. Such a situation is a suitable alternative to a simple one step form authentication to access the protected resource on the resource server.

In some arrangements, the user challenge is a knowledge-based authentication (KBA) question. Accordingly, the user provides an answer to a KBA question, e.g., selection of a multiple choice question, a keyword or phrase, etc.

It should be understood that the above-described user input may be provided separately or in combination (e.g., a passcode and a biometric scan). Moreover, additional user input may be collected from the access control device 24 transparently, e.g., geolocation from GPS circuitry in the access control device 24, a set of device signatures, accelerometer data, and so on. The access control device 24 then sends a permission response 124 back to the resource accessing device 22 which includes this collection of information.

At 130, the resource accessing device relays the answer to the user challenge to the resource server 26. In some arrangements, the access control device 24 may send the answer to the user challenge back to the resource server 26 in a manner which is out of band with the resource accessing device 22, e.g., an answer such as a passcode is sent from the passcode server directly to the resource server 26 to prevent possible caching of passcodes by the user devices 22, 24.

At 132, the resource server 26 performs an authentication operation which analyzes the answer to the user challenge. In some arrangements, the resource server 26 simply compares the received answer to an expected answer (e.g., single factor authentication, multi-factor authentication, etc.). In other arrangements, the resource server 26 performs a risk-based authentication operation (i.e., adaptive authentication) by considering extraneous user information such as geolocation, time of day, etc. For example, as part of the risk-based authentication operation, a risk engine analyzes an obtained current geolocation of the resource accessing device 22 and an obtained current geolocation of the access control device 24, and generates a risk score that is based, at least in part, on their proximity to each other. In some arrangements, the resource server 26 relies on a specialized external authentication server to perform the authentication operation.

At 134, the resource server 26 provides the resource accessing device 22 with an authentication result. If the result of the authentication operation indicates successful authentication, the user is considered legitimate and the resource server 26 provides the resource accessing device 22 with access to the protected resource 28. However, if the result of the authentication operation indicates unsuccessful authentication, the resource server 26 denies access to the protected resource 28, but may re-challenge the user (e.g., repeat 112-132 of the user authentication phase).

At 140 and 142, after successful authentication, the user accesses the protected resource 28 using the resource accessing device 22 (i.e., a user access phase). Depending on the particular protected resource 28, such access may involve a variety of activities including VPN access, file access, transaction approval, and so on.

At some point and as shown by 150, the resource server 26 (or the access control device 24) may impose a requirement to obtain further permission to continue access (i.e., a re-authentication phase). For example, the requirement may be imposed in response to the expiration of a timer or upon an event such as new transaction, etc. Here, the resource server 26 sends a new challenge message 152 which a new user challenge requiring a response.

In response to the new challenge message 152 from the resource server 26, the resource accessing device 22 then sends a new permission request 154 to the access control device 24. The permission request 154 includes a copy of the new user challenge from the challenge message 152. At 156, the access control device 24 receives the permission request 154 from the resource accessing device 22, and prompts the user for permission. It should be understood that the new user challenge may require any of the answer input described above at 122. In some arrangements, the strength of the new user challenge is different than that of the original challenge (e.g., the new user challenge may be weaker since the user has previously authenticated during the same access session via a stronger challenge).

At 158, the access control device 24 sends a new permission response 158 back to the resource accessing device 22 which includes the answer to the new user challenge. The answer may include updated extraneous user information for adaptive authentication such as geolocation, time of day, etc.

Activities 160 (conveying the answer to the new user challenge to the resource server 26, 162 (performing another authentication operation based on the answer), and 164 (providing a new authentication result to the resource accessing device 22) are carried out in manner similar to that described above during initial user authentication. In particular, the resource accessing device 22 obtains further access to the protected resource 28 when the authentication operation results in successful authentication.

Additionally, the resource accessing device 22 does not obtain further access to the protected resource 28 when the authentication operation results in unsuccessful authentication. For example, if the new user challenge is for a button press by the user on the access control device 24 and the user fails to provide the button press, the access session between the resource accessing device 22 and the protected resource 28 is terminated by the resource server 26 (i.e., failure to authentication within a predefined time limit).

At some point if the user successfully re-authenticates and continues the access session, the user terminates access to the protected resource 28. For example, the user may logout using the resource accessing device 22. Alternatively, the user may provide a termination or lockout command to the access control device 26, see 170. In response, the access control device 26 transmits a lockout signal 172 which is received by the resource server 26. In response to the lockout signal 172, the resource server 26 prevents the resource accessing device 22 from further accessing the protected resource 28.

It should be understood that the termination or lockout command entered by the user at 170 may be specific to the particular protected resource 28. Alternatively, the termination or lockout command entered by the user at 170 may be global in order to lockout multiple protected resource 28, e.g., if the user realizes that the user has misplaced the resource accessing device 22 or suspects that the resource accessing device 22 has been stolen. Further details will now be provided with reference to FIG. 4.

Figure 4:
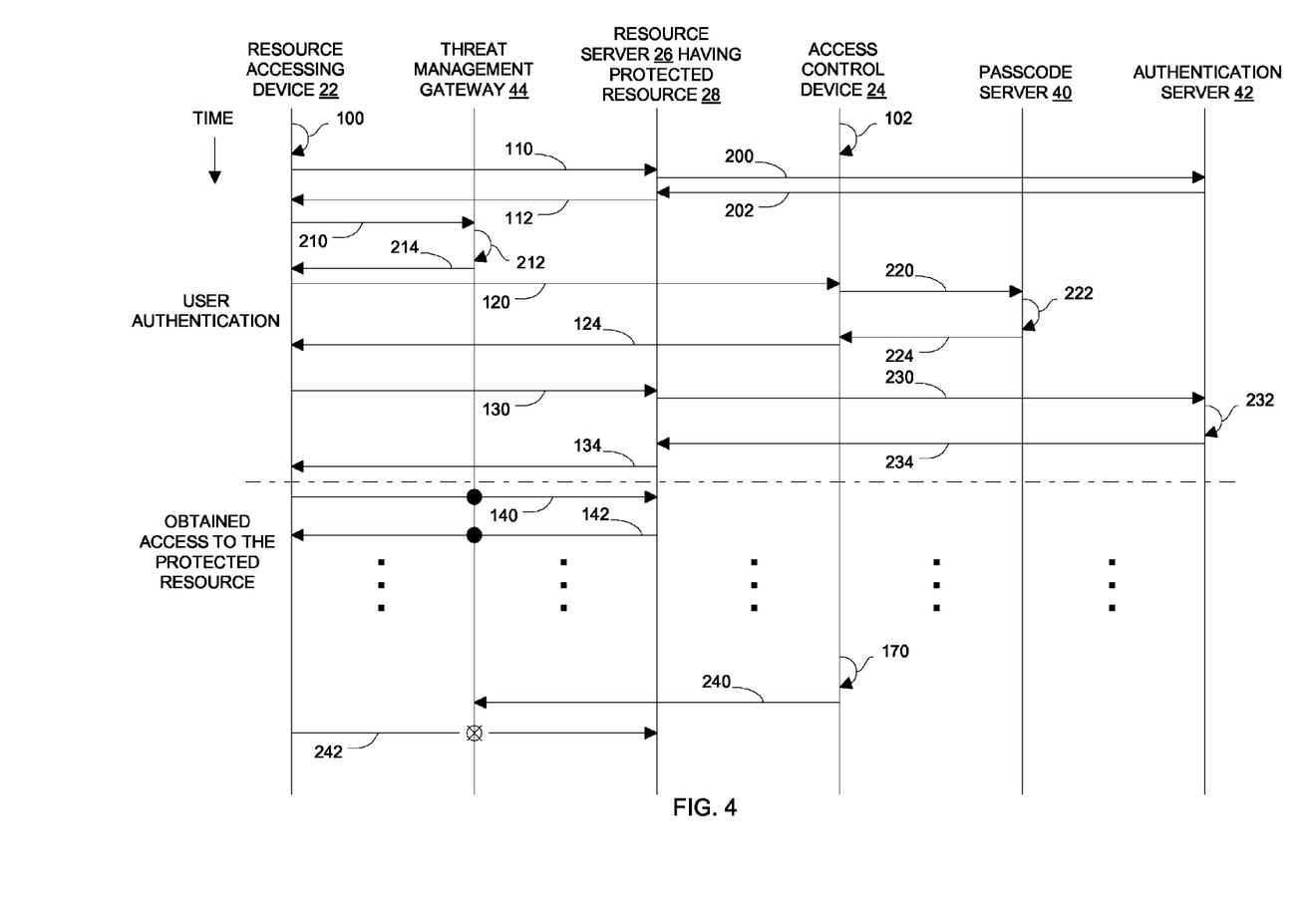
FIG. 4 is an alternative sequence diagram illustrating certain operation of the electronic environment of FIG. 1.

FIG. 4 is an alternative sequence diagram showing particular operational details involving certain components of the electronic environment 20. FIG. 4 is similar to FIG. 3 except for additional involvement of other components of the electronic environment 20. Accordingly, certain reference numbers are maintained between FIGS. 3 and 4 for similar communications.

It should be understood that there are alternative operations described with FIG. 4 vis-à-vis FIG. 3. For example, authentication is offloaded from the resource server 26 to an external authentication server 42 (also see FIG. 1). Additionally, communications between the resource accessing device 22 and the access control device 24 requires involvement of the threat management gateway 44. Furthermore, passcode storage and management is carried out by the passcode server 40. Also, termination of an existing access session can be carried out by the threat management gateway 44. Any and all of these alternatives may be combined in any combination to provide enhanced access control.

As shown in FIG. 4, during initial user authentication, the users perform sign on with both user devices 22, 24 (arrows 100, 102). Next, when the user directs the resource accessing device 22 to send an access request 110 having user identifying data to the resource server 26, the resource server 26 then transmits an authentication request message 200 to the authentication server 42. The authentication request message 200 includes a copy of the identifying data from the access request 110 (i.e., a user identifier, a user cookie, etc.).

In response to the authentication request message 200, the authentication server 42 looks up the identifying data in a user database to determine whether the user is in the user database. If the user is not in the user database, the authentication server 42 may return an error or notification message which is conveyed by the resource server 26 back to the resource accessing device 22. However, if user is in the user database, the authentication server 42 returns a challenge message 202 to the resource server 26. The challenge message 202 includes a user challenge which requires a response. Upon receipt, the resource server 26 conveys the user challenge back to the resource accessing device 22 as the challenge message 112.

Next, at 210, the resource accessing device 22 sends a locator request 210 to the threat management gateway 44. The locator request 210 may include the same user identifying data that was included in the access request 110 to properly identify the user and/or the resource accessing device 22 to the threat management gateway 44.

The threat management gateway 44 performs a lookup operation 212 to properly identify the access control device 24, and then sends a locator response 214 to the resource accessing device 22. The locator response 214 includes communications information which enables the resource accessing device 22 to properly communicate with the access control device 24 (e.g., certificates, keys, address information, etc.). In some arrangements, the resource accessing device 22 is unable to properly communicate with the access control device 24 without this communications information. In some arrangements, the resource accessing device 22 maintains an ongoing web session with the threat management gateway (e.g., via periodic redirects to the threat management gateway 44).

Upon receipt of the communications information from the threat management gateway 44, the resource accessing device 22 sends the permission request 120 to the access control device 24. The permission request 120 includes a copy of the user challenge from the challenge message 112. As mentioned earlier above, the receipt of the permission request 120 serves as an alert to the user. Accordingly, if the resource accessing device 22 falls into the hands of an adversary, the legitimate user still has possession of the access control device 24 and is immediately notified that the resource accessing device 22 has been stolen and there are attempts to use it.

Upon receipt of the permission request 120, the legitimate user may deny access if the use of the resource accessing device 22 is unauthorized. However, if use is authorized (e.g., it is the legitimate user who initiated the permission request 120), the user directs the access control device 24 to access the external passcode server 40 which manages user identifies and passcodes on behalf of the user. In some arrangements, the user operates the user interface 64 (FIG. 2) of the access control device 24 directing the access control device 24 to send a passcode request 220 to retrieve the proper answer to the user challenge from the passcode server 40. Examples of such answers include a static passcode, a one-time use passcode (e.g., generated from a secret stored in the passcode server 40), a set of certificates and/or strong passwords such as relatively long strings of symbols or alphanumeric characters, and so on.

In response to the passcode request 220, the passcode server 40 performs a passcode retrieval operation 222 which retrieves the proper passcode from a passcode database, and sends a passcode response 224 including the retrieved passcode to the access control device 24. It should be understood that this exchange may include a level of security as well (e.g., an exchange of credentials between the access control device 24 and the passcode server 40).

Next, at 124, the access control device 24 sends the permission response 124 back to the resource accessing device 22 which includes the passcode. In some arrangements, the list of resources to be accessed is not stored on the access control device 24 (i.e., it is only available on the resource accessing device 22, and any protected resource 28 displayed/listed on the access control device 24 minimally identified if at all (e.g., simply a button) to make it difficult or even impossible for a thief to correlate information between the two user devices 22, 24. As described above in connection with FIG. 3, the permission response 124 may include extraneous information for adaptive/risk-based authentication.

As further shown in FIG. 4, at 130, the resource accessing device relays the answer to the user challenge to the resource server 26. In some arrangements, the access control device 24 may send the answer to the user challenge back to the resource server 26 in a manner which is out of band with the resource accessing device 22. Then, the resource server 26 conveys the answer in a response message 230 to the authentication server 42. Accordingly, the response message 230 is essentially a reply to the earlier-provided challenge message 202 outputted from the authentication server 42.

At 232, the authentication server 42 performs an authentication operation which analyzes the answer to the user challenge. In some arrangements, the authentication server 42 simply compares the received answer to an expected answer (e.g., single factor authentication, multi-factor authentication, etc.). In other arrangements, the authentication server 42 performs a risk-based authentication operation by considering the extraneous user information.

At 234, the authentication server 42 provides an authentication result to the resource server 26. The resource server 26 determines whether to permit the user to access the protected resource 28 based on the authentication result, and passes a copy of the authentication result on to the resource accessing device 22 via 134. In particular, if the result of the authentication operation indicates successful authentication, the user is considered legitimate and the resource server 26 provides the resource accessing device 22 with access to the protected resource 28. On the other hand, if the result of the authentication operation indicates unsuccessful authentication, the resource server 26 denies access to the protected resource 28, but may re-challenge the user.

At 140 and 142, after successful authentication, the user accesses the protected resource 28 using the resource accessing device 22 (i.e., a user access phase). Depending on the particular protected resource 28, such access may involve a variety of activities including VPN access, file access, transaction approval, and so on.

It should be understood that the user may be required to re-authenticate from time to time to maintain access to the protected resource 28 using the resource accessing device 22 (e.g., after a period of time has passed, in response to an event, to perform a transaction requiring higher security, etc.). Otherwise, the threat management gateway 44 (or the resource server 26) may terminate the access session.

For the threat management gateway 44 to be able to control access, the threat management gateway 44 may continue to participate or be involved in sustaining the access session. Along these lines, there are a variety of ways to impose participation of the threat management gateway 44. For example, access from the resource accessing device 22 to the protected resource server 26 may require an ongoing web session that periodically redirects to the threat management gateway 44 to maintain the web session. In this example, the threat management gateway 44 may close the session in response to a variety of events (e.g., timeout, unsuccessful re-authentication, and so on).

At some point and as shown by 170, the user may provide a termination or lockout command to the access control device 26. In response, the access control device 26 transmits a lockout signal 240 which is received by the threat management gateway 44 (e.g., a choke point). In response to the lockout signal 172, the threat management gateway 44 prevents the resource accessing device 22 from further accessing the protected resource 28 of the resource server 26, e.g., see broken arrow 242 in FIG. 4. In particular, allowed access between the resource accessing device 22 and the resource server 26 through the threat management gateway 44 is illustrated by solid dots in FIG. 4, while prevented access is illustrated by an open dot in FIG. 4.

Again, it should be understood that the termination or lockout command entered by the user at 170 may be specific to the particular protected resource 28. Alternatively, the termination or lockout command entered by the user at 170 may be global in order to lockout multiple protected resource 28, i.e., distributed to one or more threat management gateways 44 to terminate multiple access session or to prevent access sessions from starting.

Based on the above, it should be understood that any change in the status or termination may result in warning messages of lockouts or timeout to the resource accessing device 22 and may immediately close the access session to the protected resource 28 on the resource accessing device 22 without any warning to the resource server 26. This may require that the user have to the access control device 24 during the entire session of accessing the protected resource 28. In case the access control device 24 is lost or stolen, the session may be terminated with the warning that the access control device 24 is missing and no additional detail on the termination.

Moreover, it should be understood that the threat management gateway 44 (or the authentication server 42 or both) may decide to request additional authentication input such as biometric input, etc. in order to bring a particular risk level under an acceptable value before granting access to the protected resource 28. Such operation may be suitable when the resource accessing device 22 is a public computer which is possibly infected. Further details will now be provided with reference to FIG. 5.

Figure 5:
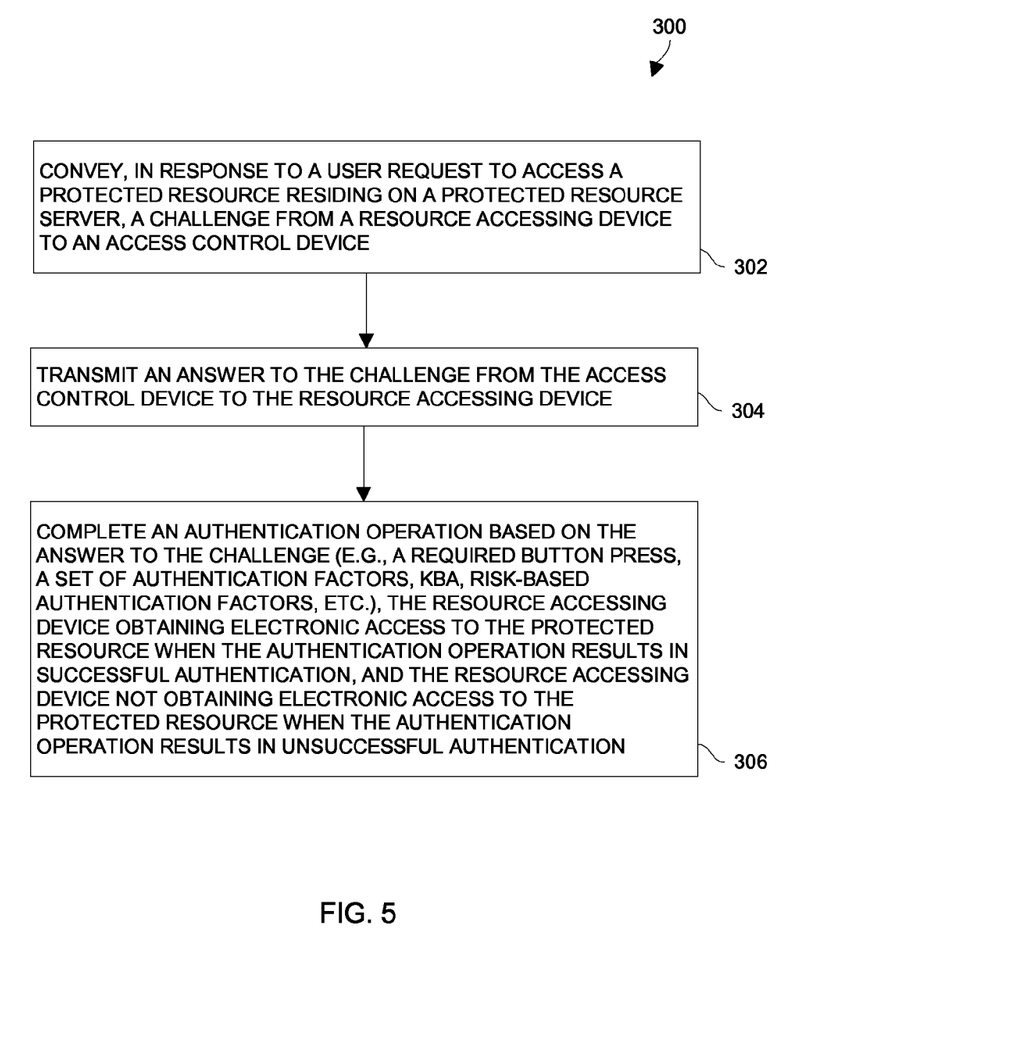
FIG. 5 is a flowchart of a procedure which is performed by the electronic environment of FIG. 1.

FIG. 5 is a flowchart of a procedure 300 which is performed by the electronic environment 20 to control access to a protected resource 28 residing on a protected resource server 26. Although the various steps are described as being performed by the electronic environment generally, it should be understood that each step is performed by a particular component or set of components of the electronic environment 20 (e.g., the resource accessing device 22 and/or the access control device 24).

In step 302, the electronic environment 20 conveys, in response to a user request to access the protected resource residing on the protected resource server, a challenge from the resource accessing device 22 to the access control device 24. This activity is illustrated by arrows 120 in FIGS. 3 and 4.

In step 304, the electronic environment 20 transmitting an answer to the challenge from the access control device to the resource accessing device. As mentioned earlier, a variety of authentication techniques are suitable for use. This activity is illustrated by arrows 124 in FIGS. 3 and 4.

In step 306, the electronic environment 306 completes an authentication operation based on the answer to the challenge. In particular, the resource accessing device 22 obtains electronic access to the protected resource 28 residing on the protected resource 26 server when the authentication operation results in successful authentication (see arrows 130-134 in FIG. 3 and arrows 130, 230, 232, 234 and 134 in FIG. 4). However, the resource accessing device 22 does not obtain electronic access to the protected resource 28 residing on the protected resource server 26 when the authentication operation results in unsuccessful authentication.

In some arrangements, the access session stays alive until terminated by the user following initial successful authentication. In other arrangements, the procedure 300 is re-performed periodically in order to maintain the access session.

At this point, it should be understood that if the resource accessing device 22 fell into the hands of an adversary and was compromised, each attempt to access a protected resource 28 using the resource accessing device 22 sends an alert to the access control device 24 thus alerting the legitimate user (see arrows 120 in FIGS. 3 and 4). The legitimate user is then able to lockout the resource accessing device 22 using the access control device 24 (see arrows 170 in FIGS. 3 and 4).

Similarly, it should be understood that if the access control device 24 fell into the hands of an adversary and was compromised, the access control device 24 cannot access the protected resources 28 of the resource servers 26. Rather, the resource accessing device 22 which is still in the hands of the legitimate user is required to access the protected resources 28. Accordingly, access to the protected resources 28 is still out of reach from the adversary.

As described above, improved techniques are directed to controlling access to a set of protected resources 28 using multiple user devices: a resource accessing device 22 and an access control device 24. Both of these user devices 22, 24 should be in the possession of a single legitimate user in order for that user to access each protected resource. In particular, the user accesses each protected resource 28 via the resource accessing device 22. Additionally, the user approves access and is informed of ongoing access via the access control device 24.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that different components of the electronic environment 20 may employ different types of authentication and challenges when controlling access to the protected resource 28. For example, in addition to requiring user authentication on each user device 22, 24 (single sign on), and user authentication when communicating with the resource server 26, other forms of authentication may be required as well. Along these lines, the user may need to authenticate with the passcode server 40 and may use a different form of authentication than that used elsewhere in the electronic environment 20, and so on.

Based on the above, one should appreciate that, at least in some arrangements, one device is used to access the data, and another device is used to approve or deny access. In these arrangements, a service is available to manage the information and a person (i.e., a legitimate user in possession of one or more of the devices) is the breaker in the system. Such modifications and enhancements are intended to belong to various embodiments of the disclosure.

What is claimed is:

1. A method of controlling access to a protected resource residing on a protected resource server, the method comprising:

in response to a user request to access the protected resource residing on the protected resource server, conveying a challenge from a resource accessing device to an access control device;

transmitting an answer to the challenge from the access control device to the resource accessing device; and completing an authentication operation based on the answer to the challenge, the resource accessing device obtaining electronic access to the protected resource residing on the protected resource server when the authentication operation results in successful authentication, and the resource accessing device not obtaining electronic access to the protected resource residing on the protected resource server when the authentication operation results in unsuccessful authentication;

wherein the access control device includes a first user interface;

and wherein the method further comprises:
- presenting the challenge to a user via the first user interface; and
- receiving user input from the user via the first user interface, the user input being conveyed from the access control device to the resource accessing device as the answer to the challenge;
- wherein the resource accessing device and the access control device are constructed and arranged to be in possession of a single human;
- wherein conveying the challenge from the resource accessing device to the access control device includes:
  - in response to a command entered by the single human into a second user interface of the resource accessing device, sending the challenge from the resource accessing device to the access control device to enable the single human to then (i) enter the answer to the challenge into the first user interface of the access control device and (ii) direct the access control device to transmit the answer to the resource accessing device.

2. A method as in claim 1, further comprising:
- prior to presenting the challenge to the user, obtaining the challenge from a challenge source device which is constructed and arranged to provide challenges to authenticate users.

3. A method as in claim 2 wherein the challenge source device is a knowledge-based authentication (KBA) server;
- wherein presenting the challenge to the user via the first user interface includes providing the user with KBA question obtained from the KBA server; and
- wherein receiving user input from the user via the first user interface includes acquiring an answer to the KBA question from the user.

4. A method as in claim 2 wherein the challenge source device is a risk-based authentication server;
- wherein presenting the challenge to the user via the first user interface includes providing the user with a standard query; and
- wherein receiving user input from the user via the first user interface includes acquiring a response to the standard query from the user, the response including risk-based authentication attributes from which the risk-based authentication server derives a risk score indicating an authentication risk level.

5. A method as in claim 2 wherein the challenge source device is a passcode authentication server;
- wherein presenting the challenge to the user via the first user interface includes providing the user with passcode request; and
- wherein receiving user input from the user via the first user interface includes acquiring a user command to send a passcode to the passcode authentication server in response to the passcode request.

6. A method as in claim 5 wherein acquiring the user command to send the passcode to the passcode authentication server includes:
- receiving, as the user command, a button press response from the user through the first user interface, the button press response directing the access control device to send the passcode to the passcode authentication server.

7. A method as in claim 5 wherein acquiring the user command to send the passcode to the passcode authentication server includes:
- receiving, as the user command, a character string password from the user through the first user interface, the character string password being sent from the access control device to the passcode authentication server.

8. A method as in claim 1, further comprising:
- receiving, as the user request, user input from the user via the second user interface, the user input selecting the protected resource among multiple selectable resources which are accessible from the resource accessing device.

9. A method as in claim 8, further comprising:
- prior to conveying the challenge from the resource accessing device to the access control device, initiating an authentication session between the resource accessing device and a challenge source device which is constructed and arranged to provide challenges to authenticate users.

10. A method as in claim 9 wherein the challenge source device is a knowledge-based authentication (KBA) server;
- wherein initiating the authentication session between the resource accessing device and the challenge source device includes acquiring, as the challenge, a KBA question from the KBA server, the KBA question then being conveyed from the resource accessing device to the access control device.

11. A method as in claim 9 wherein the challenge source device is a risk-based authentication server; and
- wherein initiating the authentication session between the resource accessing device and the challenge source device includes acquiring a standard query, the standard query then being conveyed from the resource accessing device to the access control device to prompt the user to enter a response into the access control device which includes risk-based authentication attributes from which the risk-based authentication server derives a risk score indicating an authentication risk level.

12. A method as in claim 9 wherein the challenge source device is a passcode authentication server; and
- wherein initiating the authentication session between the resource accessing device and the challenge source device includes acquiring a passcode request from the passcode authentication server, the passcode request then being conveyed from the resource accessing device to the access control device.

13. A method as in claim 1, further comprising:
- periodically re-permissioning the user via communications between the resource access device and the access control device to continue delivery of electronic access to the protected resource to the user.

14. A method as in claim 13 wherein periodically re-permissioning the user includes:
- re-authenticating the user via maintained communications between the resource access device and the access control device.

15. A method as in claim 13 wherein periodically re-permissioning the user includes:
- manually re-establishing communication between the resource access device and the access control device and re-authenticating the user via the re-established communication between the resource access device and the access control device.

16. A method as in claim 1 wherein the resource access device and the access control device communicate through a threat management gateway device; and wherein the method further comprises:
- conveying a signal from the access control device to the threat management gateway device to terminate delivery of electronic access to the protected resource to the user.

17. A method as in claim 16 wherein conveying the signal from the access control device to the threat management gateway device to terminate delivery electronic access to the protected resource is in response to a failed subsequent user authentication attempt.

18. A method as in claim 16 wherein conveying the signal from the access control device to the threat management gateway device to terminate delivery electronic access to the protected resource is in response to a lockout command provided to the threat management gateway device from the access control device.

19. A method as in claim 1, further comprising:
in response to receipt of the challenge by the access control device, obtaining, by the access control device, a passcode from a passcode server, the passcode being provided by the access control device as the answer to the challenge.

20. A computer program product having a non-transitory computer readable medium which stores a set of instructions to control access to a protected resource residing on a protected resource server, the set of instructions, when carried out by computerized circuitry, causing the computerized circuitry to perform a method of:
in response to a user request to access the protected resource residing on the protected resource server, conveying a challenge from a resource accessing device to an access control device;
transmitting an answer to the challenge from the access control device to the resource accessing device; and
completing an authentication operation based on the answer to the challenge, the resource accessing device obtaining electronic access to the protected resource residing on the protected resource server when the authentication operation results in successful authentication, and the resource accessing device not obtaining electronic access to the protected resource residing on the protected resource server when the authentication operation results in unsuccessful authentication;
further including a first user interface connected to the access control device for receiving user input from the user;
wherein the resource accessing device and the access control device are constructed and arranged to be in possession of a single human;
wherein conveying the challenge from the resource accessing device to the access control device includes:
in response to a command entered by the single human into a second user interface of the resource accessing device, sending the challenge from the resource accessing device to the access control device to enable the single human to then (i) enter the answer to the challenge into the first user interface of the access control device and (ii) direct the access control device to transmit the answer to the resource accessing device.

21. A resource accessing apparatus, comprising:
a network interface;
a first user interface of an access control device; and
a controller coupled to the network interface and the first user interface, the controller having (i) processing circuitry and (ii) memory which stores a set of instructions which, when carried out by the processing circuitry, cause the processing circuitry to:
receive a user request from a user via a second user interface of a resource accessing device,
in response to the user request, send a challenge to the access control device which presents the challenge to the user, the challenge being sent to the access control device through the network interface, and
obtain an answer to the challenge from the access control device through the network interface, the answer to the challenge being an authentication factor for an authentication operation, the resource accessing device obtaining electronic access to the protected resource residing on the protected resource server when the authentication operation results in successful authentication, and the resource accessing device not obtaining electronic access to the protected resource residing on the protected resource server when the authentication operation results in unsuccessful authentication;
wherein the resource accessing device and the access control device are in possession of a single human;
wherein sending the challenge from the resource accessing device to the access control device includes:
in response to a command entered by the single human into the second user interface of the resource accessing device, sending the challenge from the resource accessing device to the access control device to enable the single human to then (i) enter the answer to the challenge into the first user interface of the access control device and (ii) direct the access control device to transmit the answer to the resource accessing device.

22. An access control apparatus to control access to a protected resource residing on a protected resource server, the access control apparatus comprising:
a network interface;
a first user interface of an access control device; and
a controller coupled to the network interface and the first user interface, the controller having (i) processing circuitry and (ii) memory which stores a set of instructions which, when carried out by the processing circuitry, cause the processing circuitry to:
in response to a user request entered into a resource accessing device to access the protected resource residing on the protected resource server, receive a challenge from the resource accessing device,
present the challenge to a user through the first user interface of the access control device,
obtain user input from the user through the first user interface of the access control device, and
in response to the user input, send an answer to the challenge to the resource accessing device through the network interface, the answer to the challenge being an authentication factor for an authentication operation, the resource accessing device obtaining electronic access to the protected resource residing on the protected resource server when the authentication operation results in successful authentication, and the resource accessing device not obtaining electronic access to the protected resource residing on the protected resource server when the authentication operation results in unsuccessful authentication;
wherein the resource accessing device and the access control device are constructed and arranged to be in possession of a single human;
wherein conveying the challenge from the resource accessing device to the access control device includes:
in response to a command entered by the single human into the second user interface of the resource accessing device, sending the challenge from the resource accessing device to the access control device to enable the single human to then (i) enter the answer to the challenge into the first user interface of the access control device and (ii) direct the access control device to transmit the answer to the resource accessing device.

* * * * *